United States Patent [19]

Crane, Jr.

[11] 3,824,018
[45] July 16, 1974

[54] COHERENT LIGHT SOURCE DETECTOR
[75] Inventor: Robert Crane, Jr., Westport, Conn.
[73] Assignee: The Perkin-Elmer Corporation, Norwalk, Conn.
[22] Filed: Sept. 10, 1971
[21] Appl. No.: 179,439

[52] U.S. Cl. .............................................. 356/112
[51] Int. Cl. .............................................. G01b 9/02
[58] Field of Search............ 356/106 S, 106 R, 107, 356/108, 109, 110, 111, 112, 113

[56] References Cited
UNITED STATES PATENTS

| | | | |
|---|---|---|---|
| 3,217,591 | 11/1965 | Barr et al. | 356/112 |
| 3,377,912 | 4/1968 | Gate | 356/112 |
| 3,469,923 | 10/1969 | Mertz | 356/106 S |
| 3,639,030 | 2/1972 | Tsuruta | 356/106 |

OTHER PUBLICATIONS
"Basic Concepts of Optical Coherence Theory," Lane Review, 1965, pp. 295.

Primary Examiner—Ronald L. Wibert
Assistant Examiner—Conrad Clark
Attorney, Agent, or Firm—Daniel R. Levinson

[57] ABSTRACT

An unequal path interferometer, in which the two optical paths travelled by the radiation beam components before recombination differ by an amount much longer than the coherence lengths of non-coherent radiation, but much shorter than coherence length of radiation from a coherent source (e.g., a laser). Scanning of the interferometer so as to cause a change in the difference in the two optical paths will modulate the intensity of the recombined coherence radiation by varying interference effects, while the recombined non-coherent radiation can thus be detected in the presence of non-coherent radiation. When a Fabry-Perot etalon, for example, is gradually tilted to cause such changing of the optical path length difference, the resulting coherent radiation intensity modulation pattern also yields information as to the direction and wavelength of the coherent radiation source.

3 Claims, 5 Drawing Figures

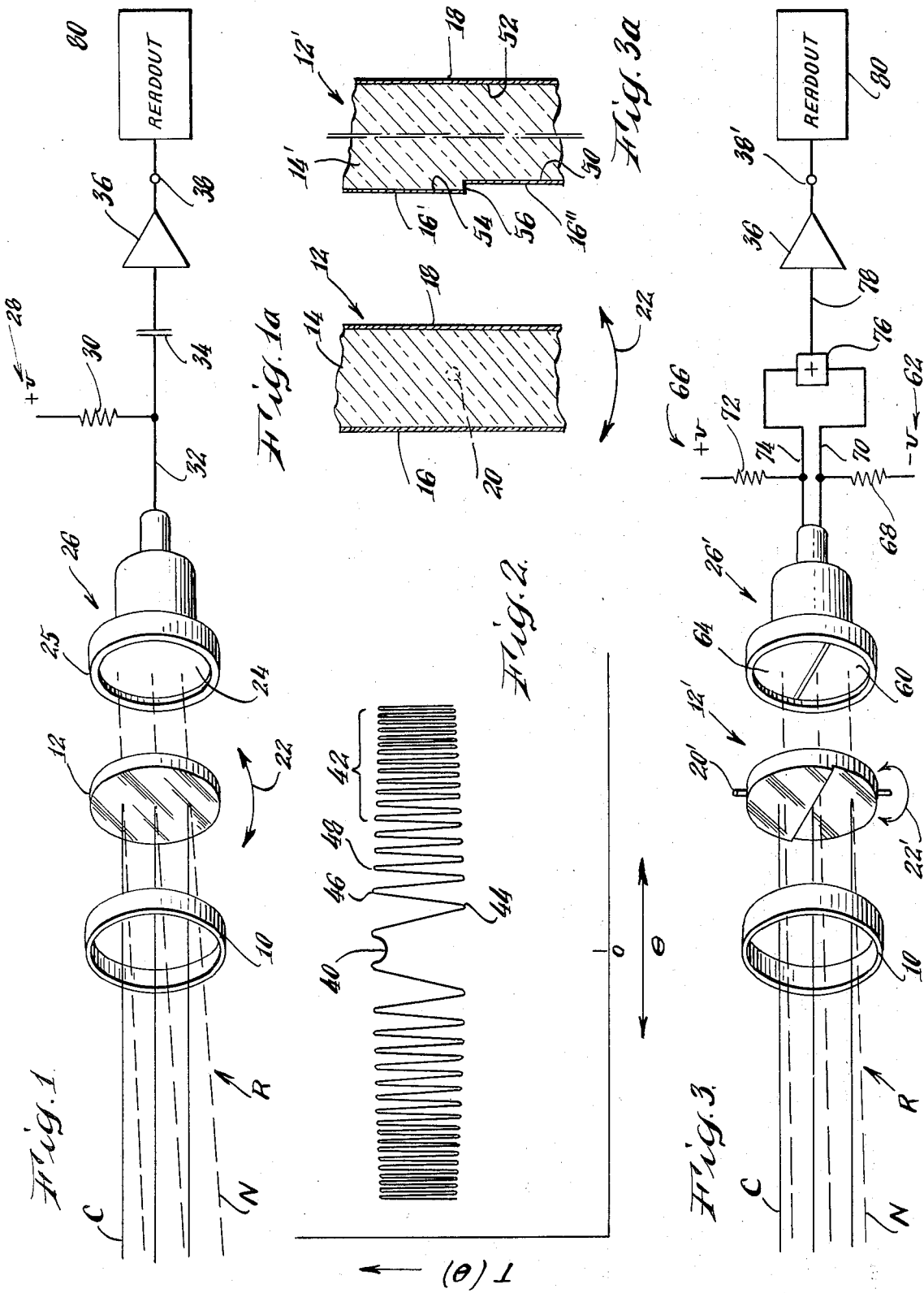

COHERENT LIGHT SOURCE DETECTOR

GENERAL DESCRIPTION

This invention relates to a device for detecting and finding the direction of a source of coherent radiation (e.g., a laser beam) in the presence of non-coherent radiation.

The invention utilizes an interferometer in which the interfering radiation beam components travel substantially unequal paths, the difference between which is relatively large compared to the coherence lengths of radiation from a non-coherent source but is substantially less than the coherence length of, for example, a laser. By effectively changing the relative lengths of the unequal paths (hereinafter referred to as "scanning") of the interferometer, the coherent radiation will pass through a series of alternate constructive and destructive (interference) phase relationships so as to cause maxima and minima; while the non-coherent radiation will not be modulated by the change in the unequal path of the interferometer so as to yield an essentially invariable intensity. The varying or "A.C." component caused by the coherent radiation as the interferometer is scanned may be separated from the "D.C." component caused by the non-coherent radiation either by electrical means in the output of a radiation detector or by using an optical and detector arrangement in which the coherent radiation intensity components are effectively added and the non-coherent (D.C.) radiation intensity components are effectively subtracted.

Although various types of unequal path interferometers may be utilized for the purpose of the invention, the invention will be described utilizing a Fabry-Perot interferometer, which may be scanned by angularly moving the Fabry-Perot parallel plate assembly or etalon about an axis perpendicular to its optical axis (the optical axis being the normal to the parallel surfaces of the Fabry-Perot etalon). The A.C. waveform of the electrical signal from a detector positioned behind the Fabry-Perot plate will be symmetrical about the position at which the angle of incidence of the parallel coherent radiation is zero (i.e., the coherent radiation is parallel to the optical axis of the Fabry-Perot element). Apparatus according to the invention is thus capable of not only determining the presence but also the exact direction of a coherent radiation source (e.g., a laser beam). Further, the A.C. waveform will exhibit a central "period" or wavelength which is linearly related to the wavelength of the coherent (e.g., laser) radiation wavelength, even though the A.C. waveform exhibits a slowly changing period (in an also proportional manner) in both directions away from the center (corresponding to a zero angle of incidence of the radiation). Thus the apparatus also can determine the wavelength of the coherent radiation (e.g., the laser wavelength) to a high degree of precision.

Accordingly an object of the invention is the provision of a device that can both find and detect the direction of a coherent radiation source in the presence of (even relatively intense) non-coherent radiation.

Another object of the invention is the provision of a device that can determine the wavelength of a coherent radiation source in the presence of a non-coherent radiation.

A more specific object of the invention is the detection and finding of the direction and/or the wavelength of a coherent radiation source by utilizing an unequal path interferometer which is capable of being scanned so as to modulate the intensity of the coherent radiation without modulating the intensity of the non-coherent background radiation.

Other objects, features and advantages of the invention will become obvious to one skilled in the art upon reading the following detailed description of two related embodiments of the invention in conjunction with the accompanying drawings, in which:

FIG. 1 is a schematic representation in perspective relation of a first embodiment of the invention;

FIG. 1a is a somewhat enlarged side elevation view of a portion of the Fabry-Perot assembly of FIG. 1;

FIG. 2 is a graphical representation of an electrical signal obtained by scanning the Fabry-Perot assembly of the FIG. 1 device;

FIG. 3 is a schematic perspective view of a second embodiment of the invention, utilizing a Fabry-Perot assembly of two different thicknesses and separate detectors in electrical opposition receiving the radiation passing through each half of the Fabry-Perot assembly, so as to null the non-coherent radiation intensity in the electrical signal from the detectors; and FIG. 3a is a greatly enlarged side elevation view of the central part of the Fabry-Perot assembly of FIG. 3.

DETAILED DESCRIPTION

In FIG. 1 incoming radiation from the left, generally indicated R, is assumed to consist of both coherent monochromatic parallel radiation (e.g., from a laser) schematically shown as solid lines generally referenced C, and ambient non-coherent (and generally non-parallel) radiation schematically illustrated by broken lines, an exemplary ray of non-coherent radiation being indicated at N. A field of view limiting means or baffle 10 restricts the field angle of radiation reaching the Fabry-Perot assembly 12. As is well known a Fabry-Perot assembly or etalon comprises two spaced parallel plane surfaces that are partially reflecting.

The Fabry-Perot etalon utilized may consist of the simple structure shown in FIG. 1a, comprising a thin transparent plate (e.g., of glass) 14 having optically polished and exactly parallel surfaces 16 and 18, which have been rendered partially reflecting. Since a relatively "low finesse" etalon is desired, surfaces 16 and 18 are preferably between about 40 to 60 percent reflecting (higher reflection yielding higher "finesse" etalons). Although, as is well known, extremely thin dielectric multilayers may be utilized for this purpose, it has been found that the partially reflecting coatings on surfaces 16, 18 may be formed by the less expensive process of depositing a single very thin metallic (e.g., aluminum) layer on the surfaces. Although the exact thickness of the etalon 12 is not critical, for coherent radiation in or near the visible light range, a thickness of between about 0.04 and 10 mm. may be used. In general thicknesses of the etalon 12 of about as little as 100 and as much as 20,000 times the wavelength of the coherent radiation have been demonstrated to be satisfactory. The etalon 12 is mounted by any conventional means (not shown) so as to be pivotable or rotatable about an axis parallel to its surfaces 16, 18 (i.e., about any axis perpendicular to the optical axis defined by the normal to these surfaces), a horizontal such axis being schematically illustrated in FIG. 1a at 20, so that the entire etalon rotates about such an axis as indicated by the arrow 22 in both FIGS. 1 and 1a.

Returning to FIG. 1 the radiation transmitted by the Fabry-Perot etalon 12 falls directly onto the radiation sensitive surface 24 of a radiation detector shown generally at 26. The detector may rotate with the Fabry-Perot etalon, in which case it is preferably positioned directly behind the etalon (including mounting the etalon on the protruding annular flange 25 of the detector housing or in some other manner); or the detector may be stationary, in which case some axial spacing between the etalon and detector (but not necessarily as much as shown) is required. This detector may be of the diffused-junction silicon photo-diode type, for example, a SGD-444-2 detector sold by E G & G, Inc., of Boston Mass. Such a photo-diode requires operating bias (e.g., between 15 and 100 volts D.C.), which is applied by the schematically illustrated D.C. voltage source 28 through a resistor 30. The electrical output 32 of the radiation detector is passed through a high pass electrical filter, shown as a simple capacitor 34, to an A.C. (audio) amplifier 36, the output of which at 38 will therefore be an amplified A.C. signal.

The relative intensity transmission through a low finesse Fabry-Perot interferometer (for radiation having a coherence length substantially greater than the thickness of the etalon) will vary according to:

$$T(\theta) = 1 + \cos [2\pi(OPD/\lambda)]/2,$$

where:

$T(\theta)$ = transmittance $\theta$ = angle of incidence between the radiation and the optical axis (normal to the surface of) the Fabry-Perot etalon $\lambda$ = wavelength of illumination (e.g., in microns)

$OPD$ = optical path difference (e.g., in microns) of directly transmitted and twice reflected (therefore also transmitted) radiation.

The optical path difference ($OPD$) for two parallel rays, one of which passes directly through the Fabry-Perot etalon and the other of which is once reflected by both surfaces so as to emerge along the same line as the first ray is given by the relationship: $OPD = 2n\, S \cos \theta'$, where:

$\theta'$ = angle of refraction (i.e., angle of incidence inside the spacer, e.g., glass) of the transmitted ray $n$ = index of refraction of spacer (e.g., glass)

$S$ = spacer thickness (e.g., in microns).

Combining the two equations above, yields:

$$T(\theta) = 1 + \cos [(4\pi n S/\pi) \cos \theta']/2.$$

FIG. 2 shows the actual detector signal, $T(\theta)$ versus the "scanning" angle of incidence $\theta$ for a 1 mm. thick low finesse Fabry-Perot interferometer utilizing the coherent radiation from a helium-neon laser. As is readily apparent from FIG. 2 the point 40 thereon, corresponding to a zero angle of incidence, is readily found in view of the perfect symmetry of the transmission curve on both sides of this normal incidence point. Further it is readily apparent that the "frequency" of the quasi-periodic variation from maximum to minimum intensity increases the greater the angle of incidence $\theta$ becomes. Thus a frequency discriminator or other device can readily determine on which side of $\theta = 0$ a particular portion of the curve shown in FIG. 2 is. Thus, even if the Fabry-Perot etalon 22 is tilted to an angular range not including a zero angle of incidence, (e.g., the range indicated by the bracket 42) such a frequency discriminator or other technique can determine the angle of the incoming coherent radiation by interpolating where the point 40 would be. In a precision alignment device, such a frequency discriminator can feed back a signal to the mechanism tilting the etalon 12 so as to cause it to be scanned over a range including the lowest frequencies (i.e., including the vicinity of the zero angle of incidence). It may be noted that the actual intensity of the zero incident point 40 is determined by the actual thickness of the plate, $S$, in the last equation above. More particularly since $\theta'$, the angle of refraction becomes zero when the angle of incidence becomes zero, the value of the transmission function at zero angle of incidence will be determined by the value of the cosine ($4\pi n S/\lambda$). Obviously for the same source of coherent radiation, the wavelength will be the same, so that the same specific curve as shown in FIG. 2 will be generated by the same Fabry-Perot etalon.

The important characteristic of the system such as the one shown in FIG. 1 is that although it will modulate the coherent radiation in the manner shown in FIG. 2 as the Fabry-Perot etalon 12 is tilted, it will not affect the intensity of non-coherent radiation reaching the detector, which will therefore stay at some D.C. level. In particular as long as the thickness, $S$, of the glass spacer 14 between the two reflective surfaces 16, 18 of the etalon is at least on the order of 100 times (or more) the wavelength of the radiation (both coherent and non-coherent) falling thereon, the non-coherent radiation will be substantially unmodulated upon tilting of the etalon, since its "coherent length" will be substantially less than the optical path difference, OPD. Although there may be a slowly changing D.C. intensity level, caused by the change in the field of view of the detector as the etalon is tilted for background (i.e., non-coherent) radiation that is not uniformly distributed in the field of view, such a change will merely cause a very slow bending of the entire wave pattern as shown in FIG. 2; even this effect may be substantially eliminated either by high order D.C. filtering or by the technique exemplified by the FIG. 3 embodiment yet to be described.

It should be noted that the apparatus according to the invention does not operate in the commonly used mode of a Fabry-Perot interferometer, in that no focusing elements are utilized after the etalon and therefore no (spatial) interference fringes are actually formed. Rather at such points as indicated at 44 (corresponding to a particular (in this case small) angle of incidence of the coherent radiation relative to the optical axis of the etalon) destructive interference occurs for all of the parallel coherent radiation impinging on the etalon as far as transmission is concerned. Stated in other terms the effective optical path difference caused by the etalon for this particular angle of incidence is such as to cause the etalon (it can be thought of as a Fabry-Perot filter) to reflect essentially all of this parallel coherent radiation (less any absorption effects); in other words the entire second (cosine term) at the right hand side of the last equation above becomes (substantially) equal to minus one. At a point such as 46 in FIG. 2 the parallel coherent radiation (of a single wavelength, of course) incident at this particular angle, $\theta$, will undergo maximum constructive interference as far as transmission is concerned across the entire surface of the etalon, so that the transmitted intensity is at a maximum. In other words at this particular angle the Fabry-Perot etalon acts as a maximum transmission filter. Thus, the tilting of the etalon about an axis perpendicular to its optical axis causes it (as far as parallel coherent radiation is concerned) to change the effective "thickness" of the etalon as seen by the parallel coherent radiation to cause the etalon to become alternately transmitting and reflecting.

To effectively null the non-coherent or background radiation, the alternate embodiment in FIG. 3 may be utilized, in which like references are utilized for like parts relative to FIG. 1. Thus the same radiation R consisting of both coherent parallel radiation C and non-coherent radiation N after passing through a field of view limiting means or baffle 10 will fall on a modified Fabry-Perot etalon 12' which is also pivoted or oscillated about an axis 20' (in the exemplary case vertical) perpendicular to its optical axis as indicated by curved arrow 22'. As may be seen in both FIGS. 3 and 3a, the modified Fabry-Perot etalon 12' comprises a transparent carrier or spacer 14' having one half of a different thickness than the other half. The difference in thickness is greatly exaggerated for clarity in FIG. 3, and is better seen in the greatly enlarged side elevation view of a small central portion as shown in FIG. 3a.

As shown in FIG. 3a one surface of the modified Fabry-Perot etalon 12' is optically flat and provided with a partially reflecting material 18 in exactly the same manner as the previously described etalon in FIGS. 1 and 1a. The other surface (which need not be the front surface, being shown as such in FIG. 3 merely for clarity and therefore assumed to be the front surface in FIG. 3a as well) has one half (e.g., its lower half) at 50 optically flat and perfectly parallel to the opposite surface 52 of the etalon. The other half of this surface at 54 is also optically flat and parallel to surface 52 (therefore to surface 50) but is spaced from surface 52 an extremely small distance greater than surface 50. In particular surface 54 is spaced (from surface 52) an exact odd multiple of quarter wavelengths of the coherent radiation to be detected divided by the index of refraction of the spacer (i.e., an odd multiple of $\lambda/4n$) greater than the surface 50; and in fact is preferably only one effective quarter wavelength ($\lambda/4n$) greater in spacing. Such spacing may be readily obtained by vacuum depositing as an extremely thin layer (i.e., a single or small odd multiple of $\lambda/4n$) indicated at 56 on the upper half of the original transparent spacer element 14' a transparent material that is either identical or has substantially the same index of refraction as the material of the spacer 14'. The additional thickness layer 56 may also be formed by merely optically polishing a single transparent element 14' on surface 50 so that surface 50 has been reduced in thickness by the desired amount. Regardless of how formed, each of the parallel half surfaces 50 and 54 will be rendered partially reflecting by use of the same reflective coating 16' and 16" thereon.

The detector assembly 26' differs from the previous detector assembly in that it comprises two separate radiation sensitive elements 60, 64 each receiving radiation substantially only from each half of the modified Fabry-Perot etalon 12'. Assuming the detector elements 60, 64 are the same photo-conductive type referred to relative to FIG. 1, each is provided an operating or bias voltage of the opposite polarity as indicated by 62, 66 (fed through respective resistors 68, 72). Therefore each of the photo-conductive detectors will produce at their outputs 70, 74 respectively a signal proportional to the intensity of the radiation falling thereon, which signals will be of opposite polarity. These outputs will be fed to a summing circuit schematically indicated at 76, the output of which at 78 will therefore contain the algebraic sum of the opposite polarity outputs (at 70, 74) of the oppositely biased detectors. This algebraic sum signal will then be fed to audio amplifier 36 so as to provide at output 38' an amplified signal proportional to the algebraic sum of the detector signals.

Since each half of the modified Fabry-Perot etalon 12' will cause exactly the converse effect in the intensity of the transmitted coherent radiation falling thereon, the algebraically added signals from the opposite polarity detectors will yield an electrical signal which is substantially identical to that shown in FIG. 2. In other words, when the, say, upper half of the Fabry-Perot etalon 12' causes complete destructive interference of the coherent radiation at a particular incidence angle, the other (say, lower) half of the etalon 12' will provide maximum constructive interference for the same radiation; thus the positively biased detector 64 will have no signal while the negatively biased detector 60 will yield a maximum negative signal, so that under such conditions a minimum (i.e., maximum negative) electrical signal is produced, analogous to point 44 in FIG. 2. When the modified Fabry-Perot etalon has been rotated slightly more, the optical effects reverse, so that transmission through the thicker upper portion of the etalon 12' will be at a maximum while complete destructive interference will occur at the thinner lower half thereof; under these conditions the positively biased detector 64 will have its maximum signal while the negatively biased detector 60 will produce no signal, so as to provide a maximum positive signal analogous to point 46 in FIG. 2. Obviously at angle positions of etalon 12' between those such as indicated at 44 and 46 in FIG. 2 one detector will be producing an increasing signal while the other will be producing a decreasing signal (of opposite sign) so as to cause the algebraic sum thereof to go from a maximum of one polarity to zero (the horizontal center line of the signal in FIG. 2) to a maximum signal of opposite polarity. Thus, except for the location of the zero voltage axis, the device of FIG. 3 will produce an electrical signal substantially identical to that of the FIG. 1 device shown in FIG. 2.

The advantage of the arrangement in FIG. 3 is that each of the detectors 60 and 64 will receive substantially identical intensities of non-coherent or background radiation regardless of the rotative position of the etalon 12'; because of the opposite polarity bias of the two detectors, the equal but opposite sign electrical signals caused thereby will be nulled by the algebraic addition occurring in the adding circuit 76. Thus, the FIG. 3 version substantially eliminates the D.C. components caused by the non-coherent radiation. Thus, the signal fed to amplifier 36 at 78 is substantially free of any D.C. components caused by such non-coherent radiation, thereby avoiding any slow bending of the center line of this signal, caused by change in such background radiation (including not only slight changes of field of view or transmission with rotation of the etalon 12' but also changes of the actual ambient radiation intensities that may occur during the scanning).

The outputs of both the FIG. 1 device at 38 and the FIG. 3 device at 38' may be fed to an appropriate electrical recorder or further electrical processing circuits (e.g., frequency discriminators) indicated schematically at 80 in both figures. Where the etalon 12 or 12' is rotated or oscillated at a constant angular velocity, the electrical output at 38 or 38' will directly yield signals of the type shown in FIG. 2 where the abscissa is time (directly proportional to the angle $\theta$). The scale of the abscissa values will be determined not only by the angular rotation rate (i.e., the constant relating $\theta$ and time) but also of course (inversely) by the thickness of the Fabry-Perot etalon. For relatively high precision the thickness of the Fabry-Perot etalon will be over a thousand times the wavelength of the coherent radiation being detected and a relatively small angular velocity will be utilized.

As with the FIG. 1 form, the FIG. 3 etalon 12' and detector 26' may be rotated together (or the etalon alone rotated) about any axis perpendicular to the optical axis (i.e., the normal to the plane surfaces) of the etalon. Although it would seem that the wavelength of the coherent radiation detected by the FIG. 3 form would have to be within a narrow range, so that layer 56 actually is substantially (or an odd multiple of) one quarter of the radiation wavelength, infact this type of device has been operated successfully for radiation over a wavelength range over 1:3. Typically therefore the useful wavelength range of even the FIG. 3 form is practically limited by the response (vs. radiation wavelength) of the radiation detector.

Thus, although the FIG. 1 form may in theory detect coherent radiation over an unlimited wavelength range, in practice the wavelength range of the detector response will determine the practical limit. In any event both forms have a relatively wide wavelength range (assuming suitable choice of the detector) which may be extended (especially in the FIG. 1 form) by substitution of various appropriate detectors to cover a wide range (e.g., 1:33) in any (e.g., visible, infrared, etc.) part of the spectrum, in which radiation acts like visible light. Both forms allow determination of the unknown wavelength of the coherent radiation source, since the relative horizontal spacing (or "wavelength") of the FIG. 2 signal will be directly proportional to the coherent radiation wavelength (i.e., the "frequency" scale of FIG. 2 is proportional to the frequency of the radiation). Thus, a particular Fabry-Perot etalon may be "calibrated" by using a known wavelength coherent source, and then used to detect a coherent source of unknown wavelength; the relative horizontal distance between corresponding points (e.g., peaks 46, 48) of the two signal outputs will then be directly proportional to the wavelengths of the known and unknown sources (for the same angular tilting of the same etalon).

Besides the wide wavelength range, both exemplary embodiments of the invention have a very wide field of view capability, being able to detect (and fine the direction of) a coherent radiation source which is tens of degrees off the central axis of the device (i.e., the horizontal line through the centers of the optical elements in both FIGS. 1 and 3) in either direction (e.g., a half-angle field of this magnitude and therefore a total field of view of twice this). When large angle sweeps are used, the tubular (or other) light baffle 10 would be rotated with the etalon (and preferably the detector would also to help minimize fall-off in the radiation reaching the detector). The combination of wide wavelength range and wide field of view greatly enhance the ability to find (and detect the direction and/or wavelength of) any coherent radiation source; in other words, neither even the approximate (angular) location nor approximate wavelength range need be "known" prior to detection (and precise determination of either or both of these characteristics). Thus the invention has a very large "probability" of finding any such coherent radiation source and determining its (angular, e.g., azimuth) position and wavelength.

To determine the (two-dimensional, e.g., azimuth and elevation) specific position of a coherent radiation source, the etalon (or the entire device) may be successively rotated about two different (say, perpendicular to each other) pivot axes both of which are perpendicular to the optical axis of the etalon; obviously, other techniques may be utilized to obtain in effect a simultaneous two dimensional scan of the object space (i.e., to left in FIGS. 1 and 3). To provide both more energy and a higher resolution (at the cost of total field of view as measured in the object space), a telescopic optical system may be positioned in front of (i.e., at the left of in FIGS. 1 and 3) the etalon. The added optical system would of course be truly telescopic (i.e., afocal) so that entering parallel rays would leave the system (and therefore impinge upon the etalon) as still parallel rays.

What is claimed is:
1. Apparatus for detecting a source of coherent radiation in the presence of non-coherent ambient radiation comprising:
   an unequal optical path length interferometer of the type in which portions of the radiation impinging on the interferometric component are caused to be recombined after travelling two different optical paths;
   said optical paths differing in length by an amount substantially greater than the coherence length of the noncoherent radiation by substantially less than the coherence length of the coherent radiation;
   means for detecting the intensity of said recombined portions and producing a signal representative thereof;
   and means for varying the effective difference in length between said two optical paths;
   said optical path length varying means being of such construction as to vary said effective optical path length difference in a known systematic manner,
   so that said detecting means produces a variable signal component caused by the varying constructive and destructive interference of the recombined coherent radiation components, while the recombined non-coherent radiation components produce only a steady background signal;
   said unequal optical path length interferometric component comprising a Fabry-Perot etalon;
   and said optical path varying means comprising means for continuous tilting said Fabry-Perot etalon through an angular range including a zero angle of incidence of the coherent radiation relative to said etalon,
   whereby said variable signal component is of almost periodic form but of gradually increasing frequency as the impinging coherent radiation makes an increasing angle of incidence relative to said etalon and said variable signal component includes a distinct form of minimum frequency corresponding to said zero angle of incidence, so that the direction of said coherent radiation source may be readily determined.

2. Apparatus according to claim 1, in which:

said tilting means is capable of constantly tilting said Fabry-Perot etalon in a linearly changing manner, so that the angle of incidence of said coherent radiation relative to said etalon also changes in such a linear manner, whereby said almost periodic variable signal component has a period at any given interval which is proportional to the wavelength of said coherent source, so that said wavelength may also be readily determined.

3. Apparatus for detecting a source of coherent radiation in the presence of non-coherent ambient radiation comprising:

an unequal optical path length interferometer of the type in which portions of the radiation impinging on the interferometric component are caused to be recombined after travelling two different optical paths;

said optical paths differing in length by an amount substantially greater than the coherence length of the non-coherent radiation but substantially less than the coherence length of the coherent radiation;

means for detecting the intensity of said recombined portions and producing a signal representative thereof;

and means for varying the effective difference in length between said two optical paths;

said optical path length varying means being of such construction as to vary said effective optical path length difference in a known systematic manner, so that said detecting means produces a variable signal component caused by the varying constructive and destructive interference of the recombined coherent radiation components, while the recombined non-coherent radiation components produce only a steady background signal;

said unequal optical path length interferometric component comprising a Fabry-Perot etalon;

and said optical path length varying means comprising means for constant tilting of said Fabry-Perot etalon;

so that said variable signal component is of almost periodic form but of gradually increasing frequency as the impinging coherent radiation makes an increasing angle of incidence relative to said etalon;

said Fabry-Perot etalon comprising two portions mutually varying in spacing between the partially reflecting surfaces by a distance equal to an odd multiple of a quarter of a wave-length of the coherent radiation;

said detecting means comprising means for separately detecting the individual intensity of the radiation passing through each of said etalon portions and producing a separate signal representative of each said individual intensity;

and means for effectively subtracting said separate signals;

whereby any steady background signal components caused by non-coherent radiation in said separate signals are substantially eliminated from the resulting difference signal, while the variable signal components caused by the coherent radiation are effectively added.

* * * * *